(12) United States Patent
Hou

(10) Patent No.: US 8,201,874 B2
(45) Date of Patent: Jun. 19, 2012

(54) INTEGRAL COMPARTMENT VEHICLE BODY

(76) Inventor: Jiurong Hou, Liaoning (CN)

( * ) Notice: Subject to any disclaimer, the term of this patent is extended or adjusted under 35 U.S.C. 154(b) by 174 days.

(21) Appl. No.: 12/733,111

(22) PCT Filed: Jun. 10, 2008

(86) PCT No.: PCT/CN2008/001121
§ 371 (c)(1),
(2), (4) Date: Feb. 10, 2010

(87) PCT Pub. No.: WO2008/154804
PCT Pub. Date: Dec. 24, 2008

(65) Prior Publication Data
US 2010/0201161 A1 Aug. 12, 2010

(30) Foreign Application Priority Data
Jun. 14, 2007 (CN) .......................... 2007 1 0011696

(51) Int. Cl.
*B60J 7/00* (2006.01)

(52) U.S. Cl. ........... 296/203.01; 296/186.1; 296/203.03; 296/146.5

(58) Field of Classification Search ............... 296/181.1, 296/182.1, 186.1, 185.1, 203.01, 205, 193.05, 296/193.07, 146.5
See application file for complete search history.

(56) References Cited

U.S. PATENT DOCUMENTS
4,950,026 A * 8/1990 Emmons ................... 296/203.01
* cited by examiner

*Primary Examiner* — Joseph Pape

(57) ABSTRACT

An integral box-like vehicle body, characterized in that it comprises a three-dimensional truss framework, the framework of the vehicle body includes two lateral trusses, which are connected to each other at the points of an upper longeron (1) of the lateral trusses by a plurality of vaulted crossbeams (7) to form a vault top, and the points of a lower longeron (2) of the lateral trusses are connected to each other to by a plurality of bottom inclined beams 5 and bottom crossbeams 6 to form a bottom truss. The deadweight of the vehicle body is 5-7 tons lower than that of the box-like semi-trailer or the box-like full trailer of the same weight. The vehicle body improves strength, rigidity and stability, and reduces the cost.

1 Claim, 2 Drawing Sheets

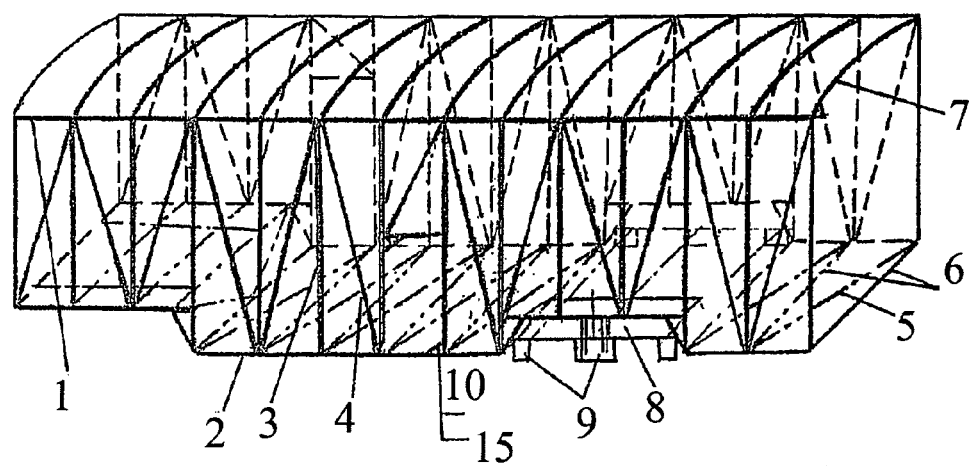
FIG. 1
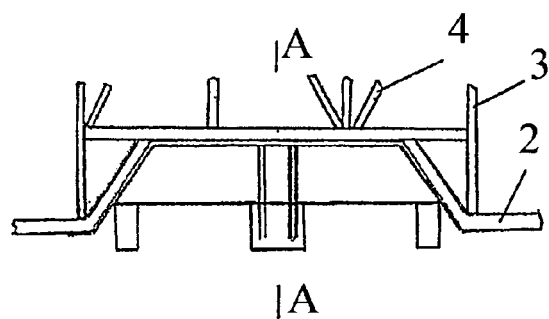
FIG. 2
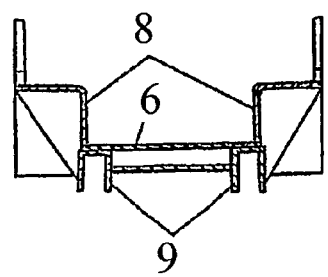
FIG. 3A-A

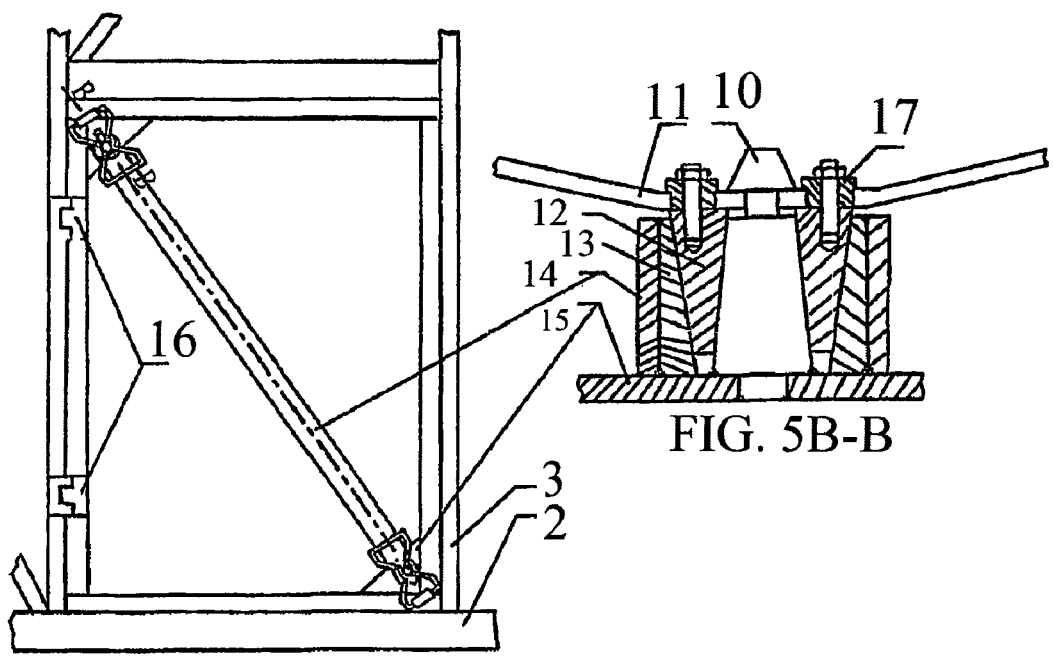

INTEGRAL COMPARTMENT VEHICLE BODY

FIELD OF THE INVENTION

The invention relates to a vehicle body for a trailer, in particular, to an integral box-like vehicle body, which is the preferred vehicle body for a box-like semi-trailer and a box-like full-trailer.

BACKGROUND

At present, a box-like trailer (a semi-trailer and a box-like full-trailer) at both home and abroad is usually a box-like trailer constructed by mounting a compartment framework and skins onto a chassis of a flat-plate trailer. The frame of a trailer is typically a trapezoid frame constituted by large-size I-beam steel and channel steel. A sealing compartment is additionally mounted onto the frame to form a non-integral vehicle body. The whole load of the entire vehicle is borne by the frame. The sealing compartment on the frame is unable to share the loads borne by the frame, rather, the weight of the compartment is entirely loaded on the frame to add loads on the frame. It is reasonable for a frame constituted by large-size I-beam steel and channel steel to be used for a cargo carrying vehicle and a flat-plate or fence-plate semi-trailer or full trailer. However, such design of toy bricks in which a frame is additionally mounted with a sealing compartment to form a sealing box-like semi-trailer or full-trailer can cause some problems. When the vehicle is fully loaded, the main beam of the frame will necessarily go through an alternating up-and-down elastic deformation, with a normal deforming extent of 50-80 mm. However, the sealing compartment on the frame will not go through such a harmonious deformation in synchronization with the frame, which would indefinitely produce very large shearing force acting on the framework and skins of the sealing compartment, resulting in the cracking of frame weld openings and the loosening and slipping off of skin rivets. During vehicle running, the cracking of weld openings and the loosening and slipping off of skin rivets occur frequently and repeatedly, thus having a serve influence on the safety of driving. This originates from the initial disadvantages of the unreasonable design of toy bricks and the only way to solve this problem is to adopt a structure of an integral vehicle body.

SUMMARY OF THE INVENTION

In view of the problems in the prior art, the invention provides an integral box-like vehicle body which meets relevant standards and provisions of the Nation and is of a reasonable design. The integral box-like vehicle body has a high strength, an excellent rigidity and a low deadweight. The integral compartment vehicle body also uses few steel to construct and has a large load capacity. The integral box-like vehicle body has a low fuel consumption and low cost of manufacturing and use. The failure rate of the integral box-like vehicle body is low and the life span thereof is extended.

The invention is achieved by the following technical solution.

An integral box-like vehicle body, characterized in that it comprises a three-dimensional truss framework, the framework of the vehicle body includes two lateral trusses, which are connected to each other at the points of an upper longeron of the lateral trusses by a plurality of vaulted crossbeams to form a vault top, and the points of a lower longeron of the lateral trusses are connected to each other to by a plurality of bottom inclined beams 5 and bottom crossbeams 6 to form a bottom truss, thus forming a three-dimensional truss framework of vehicle body in which the points are shared.

A Z-shaped beam suspending mechanism matching with a walking system is provided under the rear portion of the framework of the vehicle body on two sides, the Z-shaped beam is welded under a corresponding portion of the lower longeron, a suspending bracket is provided under the Z-shaped beam and the Z-shaped beams on two sides are connected integrally by crossbeams.

The Z-shaped beam suspending mechanism matches with any one of a single-axle walking system, a double-axle walking system and a three-axle walking system in the form of steel leaf springs, air suspensions and torsion bar independent suspensions.

A connecting assembly that matches with a semi-trailer tractor or a full-trailer is provided under the front portion of the framework of the vehicle body.

The connecting assembly is one of a saddle seat and a front axle turnplate.

A sealing door is provided at the side of the framework of the vehicle body, inclined stakes are diagonally arranged on the inner side of the door, reversely tapered bushes on two ends of the inclined stakes are hinged to a snap spring handle, which is in snap fit with a tapered lock post that is fixedly mounted on corner plates of the framework.

The lateral trusses are of a truss structure that constituted by an upper longeron, a lower longeron, a plurality of stakes and inclined stakes, wherein the inclined stakes are arranged in a ∧ shape, or arranged in parallel or in cross manner.

The section of the truss levers of the framework of the vehicle body is one of a circular tube, rectangular tube, square tube, angle steel and channel steel.

The lower longeron of the framework is one of the straight beam and a folded-line type beam.

The invention has the following advantages and beneficial effects over the prior art: the invention is tested by National Automobile Quality Supervision and Test Center (NAST) under the regulations of QC/T252-1998 Engineering Approval Evluation Program, JB/T4185-1986 semi-trailer general techniques and "Standardized Demands for Conducting Imperative Verifying and Engineering Approval Evluation Program for Special Automobiles of Automobiles" took effect on Aug. 18, 2005, and the test result shows that a) the braking system of the sample vehicle meets relevant national standard demands; b) the main technical parameters of the sample vehicle meets the enterprise standards and relevant standard demands; c) after a driving test for reliability covering 5022 km, no 1-class, 2-class and 3-class failure happens to the sample vehicle and only one 4-class failure occurred. The average mileage of failure interval is 5022 km. Furthermore, as compared with a currently popular box-like semi-trailer or box-like full-trailer with the same total weight, the invention reduces the deadweight of the vehicle by 5-7 tons, increases the strength and rigidity of the vehicle body by 100%, and increases the interior volume of the compartment by 30%. When fully loaded, the center of gravity of the vehicle of the invention is lowered significantly, thereby improving the stability of the vehicle when driving.

As compared with a vehicle with the same total weight, the deadweight of the vehicle body is reduced by 5 tons, meaning that 5 tons more cargoes can be carried. In case that the annual mileage for carrying cargoes is 60,000 km (actually over 100,000 km in practice) and the unit fee is RMB 0.5/ton·km, RMB 150,000 can be earned additionally in one year.

The effect of saving fuel is significant. For example, for a vehicle with a 30-ton total weight and a fuel consumption per ton of M/30 L/100 kms, when the deadweight is lowered by 6 tons, the fuel consumption thereof will be reduced by 6/30M L/100 kms, i.e., the fuel consumption is reduced by 20%.

The decrease of 5 to 7 tons of the deadweight means that 5 to 7 tons of steel can be saved. In China, the annual yield of the box-like semi-trailer is about an number of 100,000. If the invention is spread out widely in China, 600,000 tons of steel can be saved annually for the country. In summary, the invention is a big matter that benefits both the nation and the people.

BRIEF DESCRIPTION OF THE DRAWINGS

FIG. 1 is a schematic structural view of a framework of a vehicle body of the invention.

FIG. 2 is a front schematic structural view of a Z-shaped beam suspending mechanism of FIG. 1

FIG. 3 is a schematic structural sectional view along the A-A line of FIG. 2.

FIG. 4 is a front schematic structural view of a sealing door on lateral trusses.

FIG. 5 is a sectional schematic structural view along the B-B line of FIG. 4 in which: 1. upper longeron; 2. lower longeron; 3. stake; 4. inclined stake; 5. bottom inclined beam; 6. bottom crossbeam; 7. vaulted crossbeam; 8. Z-shaped beam; 9. suspending bracket; 10. tapered lock post; 11. snap spring handle; 12. reversely tapered bush; 13. tapered seat sleeve; 14. inclined stake; 15. corner plate; 16. sealing door hinge; 17. cam.

DETAILED DESCRIPTION OF THE INVENTION

Embodiments of the invention are described in detail in combination with the appended drawings. However, the invention is not limited to the embodiments.

As shown in FIG. 1, an upper longeron 1 and a lower longeron 2 are connected to each other at points designed to have predetermined intervals through stakes 3 and inclined stakes 4 on a dedicated mounting table, forming a lateral truss. A completely identical lateral truss is formed on the other side. The left and right lateral trusses are connected to each other at the points of the upper longeron 1 by vaulted crossbeams 7 to form a vaulted top. The points of the lower longeron 2 are connected to each other by bottom inclined beams 5 and bottom crossbeams 6, to form a bottom truss. However, the front portion of the bottom truss is provided with only bottom crossbeams 6 and is not provided with bottom inclined beams 5 since a saddle seat for a semi-trailer tractor or a front axle turnplate for a full-trailer is to be mounted at the front portion of the bottom truss. For the same reason, the rear portion of the bottom truss is provided only with bottom crossbeams 6 and is not provided with bottom inclined beams 5 since a Z-shaped beam suspending mechanism matching with a single-axle walking system, a double-axle walking system or a three-axle walking system in the form of steel leaf springs, air suspensions and torsion bar independent suspensions, is to be mounted at the rear portion the bottom truss, as shown in FIG. 2. The front and read end face of the framework of the vehicle body of the thus-formed three-dimensional truss structure can be sealed by a sealing door or a skin in accordance with the prior art. A sealing door may be provided at the lateral trusses where a vehicle door is reserved between two stakes 3. Inclined stakes 4 are provided above the upper frame of the sealing door and arranged diagonally at the inner side of the door. Tapered seat sleeves 13 are provided at two ends of the inclined stakes 4. The two ends are hinged to a snap spring handle 11 through s tapered bush 12 inside the tapered seat sleeve 13. The snap spring handle 11 disengages from and snaps with the tapered lock post 10 welded on the framework corner plate 15 through the expansion and furling of a cam 17. The inclined stakes 4 are connected with the stake 3 through the sealing door hinge 16. Such structure makes the inclined stakes 14 to sustain the action force from upper and lower points, thus ensuring that the strength and rigidity of the lateral trusses will not be weakened. When the door is opened, the snap spring handle 11 forces the tapered bush 12 to disengage from the tapered lock post 10 under the action of the cam 17. The Z-shaped beam suspending mechanism, such as the Z-shaped beam as shown in FIGS. 2 and 3, is welded under corresponding portion of the folded-line type lower longeron 2. A suspending bracket 9 is provided under the Z-shaped beam 8. The Z-shaped beams 8 on two sides are connected by bottom crossbeams 6 to integrally form a Z-shaped beam suspending mechanism and construct an integral framework of a vehicle body. Then, metal skins are welded or riveted on the inner and outer surfaces of the framework. Pattern steel plates are welded above the bottom truss to form the final product of an integral vehicle body. The section of the levers on the framework of the vehicle body is one of a circular tube, rectangular tube, square tube, angle steel and channel steel. The inclined stakes 4 are arranged in a $\wedge$ shape, or arranged in parallel or in cross manner.

APPLICABLE EMBODIMENTS

The integral vehicle body of a three dimensional truss structure according to the invention is applied to an XY9190TCL vehicle transportation semi-trailer. The vehicle is fully detected and tested, in September, 2006, by NAST under various item of 1) QC/T252-1998 Engineering Approval Evluation Program for Special Automobiles, 2) JB/T4185-1986 semi-trailer general techniques and 3) "Standardized Demands for Conducting Imperative Verifying and Engineering Approval Evluation Program for Special Automobiles of Automobiles" taking effect on Aug. 18, 2005. A test report No. QB06001280051 was issued. The test result shows that: 1) the braking system of the sample vehicle meets relevant national standard demands; 2) the main technical parameters of the sample vehicle meets the enterprise standards and relevant standard demands; 3) after a driving test for reliability covering 5022 kms, including 1000 kms of mountain area road, 1000 kms of strengthened road, 1500 kms of highway and 1500 kms of normal road, no 1-class, 2-class and 3-class failure happens to the sample vehicle and only one 4-class failure occurred (the fastener loosened). The average mileage of failure interval is 5022 kms.

Therefore, it can be seen that the integral box-like vehicle body has completely obtained the desired effect of design and achieved the objective of the invention.

What is claimed is:

1. An integral box-like vehicle body comprising a three-dimensional truss framework, which comprises a plurality of vaulted crossbeams, a plurality of bottom inclined beams, a plurality of bottom crossbeams, and two lateral trusses having a plurality of upper longeron points and a plurality of lower longeron points, wherein each of said lateral trusses is connected to each other at said points of upper longeron by said vaulted crossbeams to form a vault top, wherein said points of said lower longeron of each of said lateral trusses are connected to each other by said bottom inclined beams and said bottom crossbeams to form a bottom truss, so as to form a three-dimensional truss framework of said vehicle body, wherein said integral box-like vehicle body further comprises a sealing door, a plurality of inclined stakes, a plurality of reversely tapered bushes, a tapered lock post, a plurality of corner plates, and a snap spring handle, wherein said sealing door is provided at a side of said framework of said vehicle body, wherein said inclined stakes are diagonally arranged on the inner side of said door, wherein said reversely tapered bushes are provided on two ends of each of said inclined stakes which are hinged to said snap spring handle, which is also in snap fit with said tapered lock post that is fixedly mounted on said corner plates of said framework.

* * * * *